March 17, 1925. 1,529,757
J. C. TALBERT
LIGHT-DEFLECTOR FOR AUTOMOBILES
Filed March 31, 1924
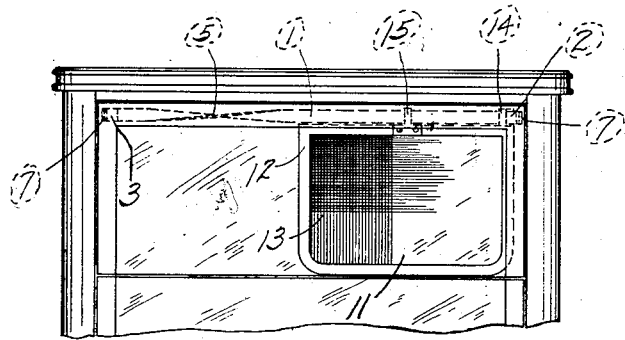
FIG. 1.
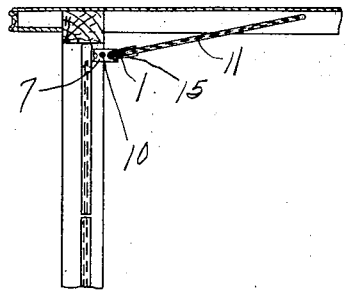
FIG. 2.
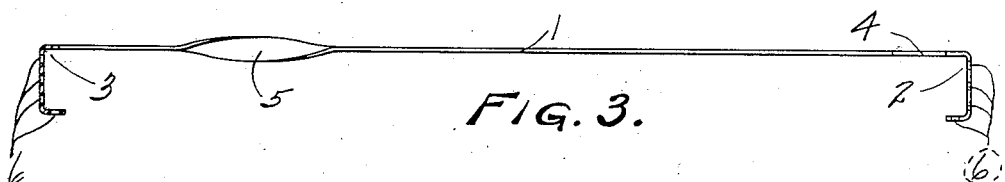
FIG. 3.
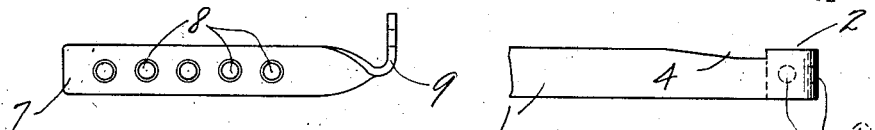
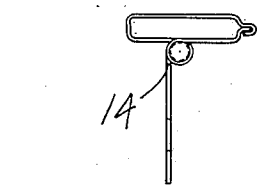
FIG. 5.           FIG. 4.
FIG. 7.
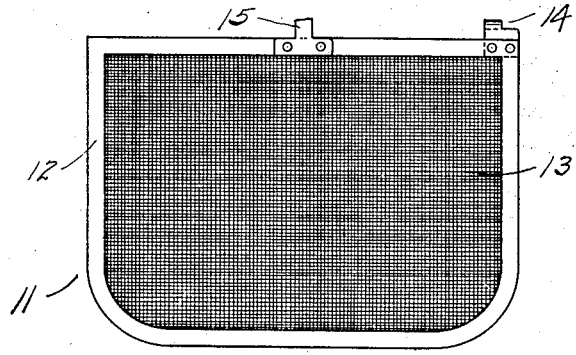
FIG. 6.
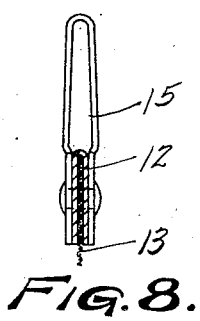
FIG. 8.
Inventor
Jack Clifford Talbert.
By Adam E. Fisher.
Attorney Patented Mar. 17, 1925.

1,529,757

UNITED STATES PATENT OFFICE.

JACK CLIFFORD TALBERT, OF COLORADO SPRINGS, COLORADO.

LIGHT DEFLECTOR FOR AUTOMOBILES.

Application filed March 31, 1924. Serial No. 703,055.

*To all whom it may concern:*

Be it known that JACK CLIFFORD TALBERT, a citizen of the United States, residing at Colorado Springs, in the county of El Paso and State of Colorado, has invented certain new and useful Improvements in Light Deflectors for Automobiles, of which the following is a specification.

This invention relates to light deflectors for automobiles, and its main object is to provide a deflector that can be mounted in an automobile within easy reach of the chauffeur to enable him to use the same when desired.

Another object is to provide a practical and efficient deflector of such construction and design that will permit its being slipped above the heads of the occupants of the machine when not in use, and conceal it from exterior view.

These and other objects will be apparent from the accompanying drawing and specification.

In the drawing—

Figure 1 is an elevation of the light reflector when installed in an automobile;

Figure 2 is a side elevation of the light deflector when installed in an automobile and slipped above the heads of the occupants;

Figure 3 is a detail of the bar;

Figure 4 is an enlarged detail of the bar showing the method of holding the deflector in place when in use;

Figure 5 is a detail of the brackets;

Figure 6 is a detail of the deflector;

Figure 7 is an enlarged detail of the hinged loop;

Figure 8 is an enlarged detail of the straight loop.

In carrying out this invention I provide a bar 1 having its ends 2 and 3 bent into the shape of a channel. The said bar 1 is provided with a tapered cutout 4 near the end 2, and a twist 5 near the end 3, for a purpose to be later explained. A series of apertures 6 are pierced in the ends 2 and 3 of the bar 1. Brackets 7 having a series of apertures 8 pierced therein for adjustment purposes, and having their ends 9 twisted to permit securing them to the inner top of an automobile, are secured to the ends 2 and 3 of the bar 1 by means of machine screws 10 passed through the apertures 6 and 8. A deflector 11, consisting of a frame 12 and a doubled black enameled screen 13, or its equivalent, is slidingly secured to the bar 1 by means of a hinged loop 14 and a straight loop 15.

In operation, the hinged loop 14 engages the tapered cutout 4 which prevents the deflector 11 from creeping to the side. When it is not desired to use the deflector 11, it may be slipped to the side until the loop 14 engages the twist 5 and raises the said deflector 11 above the heads of the occupants.

While I have herein described a certain specific method of constructing and assembling the elements of my invention, it is understood same may be varied in minor details, not departing from the spirit of my invention as defined in the appended claims.

I claim:

1. In combination with the inner top of an automobile, a light deflector, comprising a bar, having its ends bent and a series of apertures pierced therein, and a tapered cutout near one end and a twist near the other end; brackets, having their ends twisted and a series of apertures pierced therein, secured to the ends of the bar; a deflector; and hinged and straight loops, secured to the deflector, engaging the bar.

2. A light deflector, comprising a bar, having its ends bent and a series of apertures pierced therein, and a tapered cutout near one end and a twist near the other end; brackets, having their ends twisted and a series of apertures pierced therein, secured to the ends of the bar; a frame; doubled black enameled screen, or its equivalent, secured to the frame; and hinged and straight loops secured to the frame, engaging the bar.

In testimony whereof I affix my signature.

JACK CLIFFORD TALBERT.

Witnesses:
W. A. EASTON,
MARY C. TROVINGER.